United States Patent
Thompson et al.

(10) Patent No.: US 10,663,669 B2
(45) Date of Patent: May 26, 2020

(54) OPTICAL COUPLING STRUCTURE FOR COUPLING AN INTEGRATED SILICON GERMANIUM PHOTODETECTOR/TRANSIMPEDANCE AMPLIFIER AND AN INTEGRATED OPTICS CIRCUIT

(71) Applicant: Lumentum Operations LLC, Milpitas, CA (US)

(72) Inventors: Lance Thompson, Livermore, CA (US); Shibnath Pathak, Milpitas, CA (US)

(73) Assignee: Lumentum Operations LLC, Milpitas, CA (US)

( * ) Notice: Subject to any disclaimer, the term of this patent is extended or adjusted under 35 U.S.C. 154(b) by 0 days.

(21) Appl. No.: 16/126,841

(22) Filed: Sep. 10, 2018

(65) Prior Publication Data
US 2020/0081202 A1    Mar. 12, 2020

(51) Int. Cl.
G02B 6/42        (2006.01)
G02B 6/30        (2006.01)
G02B 6/122       (2006.01)

(52) U.S. Cl.
CPC .......... *G02B 6/305* (2013.01); *G02B 6/1228* (2013.01); *G02B 6/42* (2013.01); *G02B 6/4295* (2013.01); *G02B 6/4203* (2013.01)

(58) Field of Classification Search
CPC ........ G02B 6/1228; G02B 6/305; G02B 6/42; G02B 6/4203; G02B 6/4295
See application file for complete search history.

(56) References Cited

U.S. PATENT DOCUMENTS 5,910,012 A *  6/1999  Takeuchi ........... G02B 6/12004
                                        257/E31.128
7,941,023 B2 *  5/2011  Patel ..................... G02B 6/122
                                            385/129

(Continued)

OTHER PUBLICATIONS

Chen et al., "-1 V Bias 56 Gbps Germanium Waveguide p—i—n Photodetector with Silicon Contacts", 2016, 2Photonics Research Group, Department of Information Technology, Ghent University—IMEC, B-9000 Ghent, Belgium, 3 pages.

(Continued)

*Primary Examiner* — Daniel Petkovsek
(74) *Attorney, Agent, or Firm* — Harrity & Harrity, LLP

(57) ABSTRACT

An optical device may include an optical coupling structure to couple a silicon-germanium photodetector to an integrated optics circuit. The optical coupling structure may comprise a silicon waveguide. The silicon waveguide may be tapered such that a thickness of the silicon waveguide at a first end of the optical coupling structure is smaller than a thickness of the silicon waveguide at a second end of the optical coupling structure, and may be tapered such that a width of the silicon waveguide at the first end is smaller than a width of the silicon waveguide at the second end. The optical coupling structure may include a silicon-nitride waveguide that covers the silicon waveguide, and is tapered such that a width of the silicon-nitride waveguide at the first end is smaller than a width of the silicon-nitride waveguide at the second end. The optical coupling structure may include a silica waveguide.

20 Claims, 8 Drawing Sheets

(56) References Cited

U.S. PATENT DOCUMENTS

| | | | | |
|---|---|---|---|---|
| 8,000,565 B2* | 8/2011 | Liu | ............... | G02B 6/12004 |
| | | | | 385/131 |
| 9,231,131 B2* | 1/2016 | Assefa | ............... | H01L 31/1804 |
| 9,316,792 B2* | 4/2016 | Park | ............... | G02B 6/305 |
| 9,335,475 B2* | 5/2016 | Ono | ............... | G02B 6/34 |
| 2004/0017976 A1* | 1/2004 | Luo | ............... | G02B 6/1228 |
| | | | | 385/43 |
| 2005/0105853 A1* | 5/2005 | Liu | ............... | G02B 6/1228 |
| | | | | 385/43 |

OTHER PUBLICATIONS

Lee et al., "A Cost Effective Silica-Based 100G DP-QPSK Coherent Receiver", https://www.e-sciencecentral.org/articles/SC000017656, ETRI Journal 2016; 38(5): 981-987, 2016, 7 pages.

Bowers et al., "High-gain high-sensitivity resonant Ge/Si APD photodetectors", May 3, 2010, 8 pages.

Tao et al., "Improving coupling efficiency of fiber-waveguide coupling with a double-tip coupler", Optics Express vol. 16, Issue 25, pp. 20803-20808 (2008), 6 pages.

Chen et al., "-1 V bias 67 GHz bandwidth Si-contacted germanium waveguide p—i—n photodetector for optical links at 56 Gbps and beyond", vol. 24, Issue 5, pp. 4622-4631 (2016), 7 pages.

Nicholas J. D. Martinez et al., "High performance waveguide-coupled Ge-on-Si linear mode avalanche photodiodes", Optics Express vol. 24, Issue 17, pp. 19072-19081 (2016), 10 pages.

Ali Kemal Okyay, "Si—Ge Photodetection Technologies for Integrated Optoelectronics" https://web.stanford.edu/group/dabmgroup/publications/t20.pdf, Sep. 2007, 206 pages.

* cited by examiner

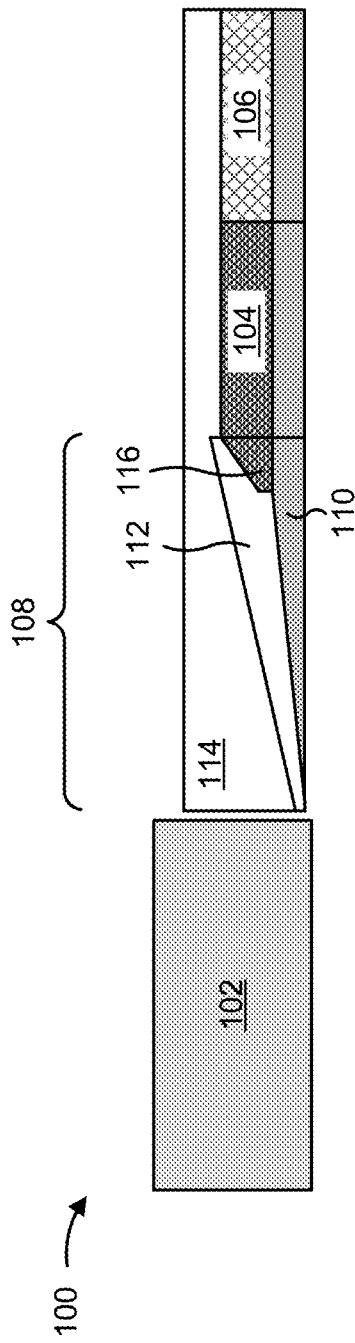
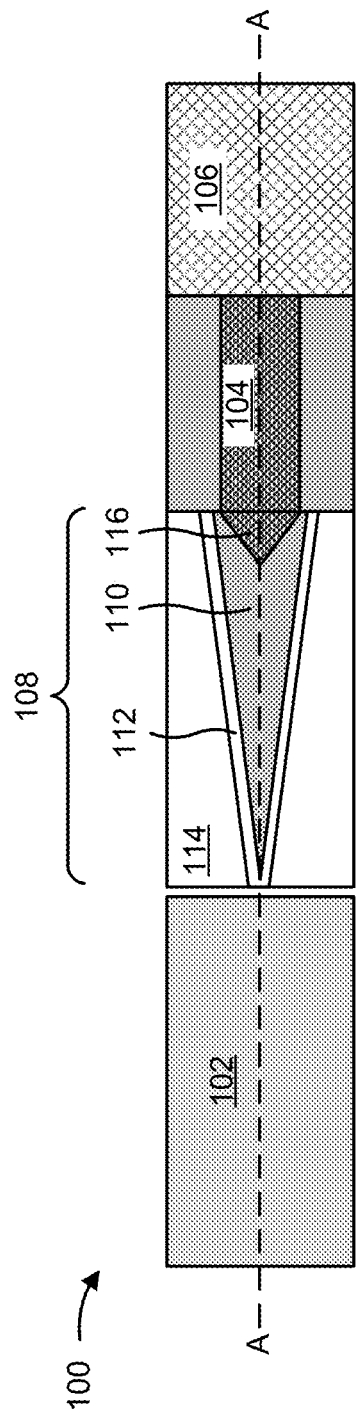
FIG. 1A
FIG. 1B

US 10,663,669 B2

OPTICAL COUPLING STRUCTURE FOR COUPLING AN INTEGRATED SILICON GERMANIUM PHOTODETECTOR/TRANSIMPEDANCE AMPLIFIER AND AN INTEGRATED OPTICS CIRCUIT

TECHNICAL FIELD

The present disclosure relates to an optical coupling structure and, more particularly, to an optical coupling structure for coupling an integrated silicon germanium photodetector/transimpedance amplifier and an integrated optics circuit.

BACKGROUND

An optical receiver may be designed to receive light as an input signal and convert one more wavelength channels, included in the input signal, to one or more respective electrical signals. This functionality can be provided by, for example, an optical receiver that includes an integrated optics circuit, a set of photodetectors (PDs), and a set of transimpedance amplifiers (TIAs). In an example operation, the input light is received (via an optical fiber) at the integrated optics circuit. The integrated optics circuit separates the input light into a group of wavelength channels. Next, each wavelength channel is coupled to a respective PD of the set of PDs, which converts the wavelength channel from an optical signal to an electrical current. The current signal is then provided to a respective TIA of the set of TIAs, which converts the current signal to a voltage signal, and outputs the voltage signal (e.g., for further signal processing, as an output of the optical receiver, and/or the like).

SUMMARY

According to some possible implementations, an optical device may include: a silicon-germanium photodetector; and an optical coupling structure to couple the silicon-germanium photodetector to an integrated optics circuit, wherein the optical coupling structure comprises: a silicon waveguide, wherein the silicon waveguide is tapered such that a thickness of the silicon waveguide at a first end of the optical coupling structure is smaller than a thickness of the silicon waveguide at a second end of the optical coupling structure, wherein the first end of the optical coupling structure is to couple to the integrated optics circuit and the second end of the optical coupling structure couples to the silicon-germanium photodetector, and wherein the silicon waveguide is tapered such that a width of the silicon waveguide at the first end of the optical coupling structure is smaller than a width of the silicon waveguide at the second end of the optical coupling structure; a silicon-nitride waveguide that covers the silicon waveguide, wherein the silicon-nitride waveguide is tapered such that a width of the silicon-nitride waveguide at the first end of the optical coupling structure is smaller than a width of the silicon-nitride waveguide at the second end of the optical coupling structure; and a silica waveguide that covers the silicon-nitride waveguide.

According to some possible implementations, an optical device may include: an optical coupling structure having a first end that is to couple to an integrated optics circuit and a second end that couples to a silicon-germanium photodetector, the optical coupling structure comprising: a silicon waveguide, wherein a thickness of the silicon waveguide at the second end is larger than a thickness of the silicon waveguide at the first end, and wherein a width of the silicon waveguide at the second end is larger than a width of the silicon waveguide at the first end; a silicon-nitride waveguide arranged on the silicon waveguide, wherein a width of the silicon-nitride waveguide at the second end is larger than a width of the silicon-nitride waveguide at the second end; and a silica waveguide arranged on the silicon-nitride waveguide.

According to some possible implementations, an optical coupling structure may include: a silicon waveguide, wherein a size of the silicon waveguide tapers along a length of the optical coupling structure between a second end of the optical coupling structure and a first end of the optical coupling structure, wherein the first end of the optical coupling structure is to couple to an integrated optics circuit, and wherein the second end of the optical coupling structure couples to a silicon-germanium photodetector; a silicon-nitride waveguide arranged on the silicon waveguide, wherein a size of the silicon-nitride waveguide tapers along the length of the optical coupling structure between the second end of the optical coupling structure and the first end of the optical coupling structure; and a silica waveguide arranged on the silicon-nitride waveguide.

BRIEF DESCRIPTION OF THE DRAWINGS

FIGS. 1A and 1B are diagrams of an example implementation described herein.

DETAILED DESCRIPTION

Figure 2A:
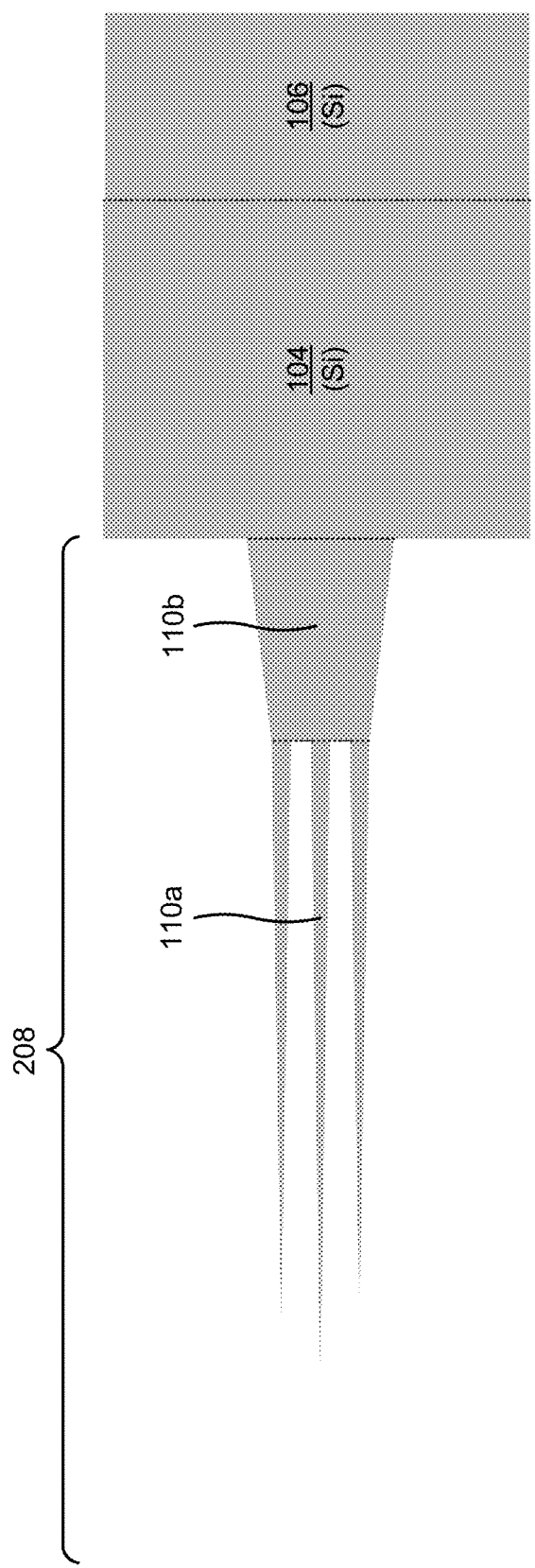
FIGS. 2A-2H are diagrams associated with an example implementation of an improved optical coupling structure that is coupled to an integrated SiGe PD/TIA.

The following detailed description of example implementations refers to the accompanying drawings. The same reference numbers in different drawings may identify the same or similar elements.

As described above, an optical receiver may include a PD that is connected to a TIA in order to allow the PD to provide a current signal, associated with an optical signal received by the PD, to the TIA. In many cases, the PD is external to (i.e., a separate component from, not integrated with) the TIA, and is connected to the TIA via a wirebond. For example, in some cases, the optical receiver may include an integrated optics circuit in the form of a planar lightwave circuit (PLC), the PD is a discrete PD (e.g., a PD formed using a III-V semiconductor material), and the TIA is a silicon-germanium (SiGe) TIA. Here, the PLC may couple to the discrete PD via top-illumination (e.g., such that the PLC illuminates a top surface of the discrete PD), and the discrete PD may be connected to the SiGe TIA via a wirebond. As another example, in some cases, the optical receiver may include an integrated optics circuit in the form of a silicon photonic circuit, the PD may be a SiGe PD that is integrated within the silicon photonic circuit, and the TIA is a SiGe TIA. Here, integration of the SiGe PD within the silicon photonic circuit provides coupling of the silicon photonic circuit and the SiGe PD, and the SiGe PD is connected to the SiGe TIA via a wirebond.

However, the wirebond used to connect the PD and the TIA in such solutions presents numerous problems. For example, a wirebond can result in high capacitance (e.g., caused by bond pads needed to establish the wirebond connection) and/or high inductance (e.g., caused by a length of the wirebond). Further, the repeatability of manufacturing of wirebonds may prevent wirebonds from being manufactured perfectly identical to one another, which may cause amounts of inductance to vary among wirebonds. Additionally, a wirebond is a poor RF transmission medium and, thus, may be sub-optimal for transmission of the electrical signal from the PD to the TIA. Furthermore, design and/or performance of the TIA may be hampered by an undesirably high input impedance that results from the wirebond connection.

Integrating the PD and the TIA eliminates the need for a wirebond connecting the PD and the TIA. For example, a SiGe complementary metal-oxide-semiconductor (CMOS) technology platform can be used to fabricate a SiGe TIA. A typical geometry of a SiGe CMOS process results in a silicon layer with a thickness of approximately 220 nanometers (nm) that is separated from a silicon substrate by an oxide layer (e.g., an oxide layer with a thickness of approximately 2 microns (μm)), with a germanium layer (e.g., a germanium layer with a thickness of approximately 150 nm, which may enable a low carrier transit time) deposited on the silicon layer. A SiGe PD can be integrated into this SiGe technology platform. For example, one or more additional layers of germanium can be deposited during processing in order to create the basis of a SiGe PD (e.g., a p-i-n PD, an avalanche PD, and/or the like). Thus, the SiGe PD and a SiGe TIA can be integrated using the SiGe CMOS technology platform, thereby eliminating a need for a wirebond connection.

With regard to launching input light into the SiGe PD, in prior cases, a SiGe PD has been coupled to an integrated optics circuit via top-illumination, or via a 220 nm square single mode waveguide (e.g., a 220 nm×220 nm single mode waveguide) that is formed using the 220 nm thick silicon layer. However, there are issues with both of these approaches. With regard to the use of top-illumination, an achievable bandwidth of a top-illuminated SiGe PD increases as an area of illumination decreases. However, a responsivity of the top-illuminated SiGe PD decreases as the area of illumination decreases. Thus, as the area of illumination is reduced in order to increase bandwidth, the responsivity suffers (and vice versa). This trade-off between bandwidth and responsivity is undesirable, and is untenable at some baud rates (e.g., baud rates above approximately 25 gigahertz (GHz)).

A solution to this issue was to create a waveguide SiGe PD that allows a length of the SiGe PD to increase the responsivity, without increasing a thickness (e.g., in order to allow the bandwidth to remain sufficiently high). Such a waveguide SiGe PD can range from approximately 5 μm to approximately 10 μm in width and length, and include a set of germanium layers with a thickness on the order of approximately 500 nm. Where this solution suffers is that a waveguide that couples light into the waveguide SiGe PD is nominally required to be a 220 nm square (e.g., in order to retain TM and TE mode propagation of input light).

Launching input light into a 220 nm square silicon waveguide from an integrated optics circuit (e.g., a PLC) or a fiber (e.g., a lensed fiber) requires an optical coupling structure. A prior optical coupling structure used for such coupling has been shown to result in an undesirable amount of loss. A significant contributor to this loss results from a mode field diameter of the input light (e.g., which can be approximately 5 μm when launched by a PLC or a lensed fiber) being significantly larger than a mode field diameter of a 220 nm square silicon waveguide that is compatible with the SiGe CMOS process.

Some implementations described herein provide an improved optical coupling structure for coupling to an integrated SiGe PD/TIA (i.e., a SiGe PD integrated with a SiGe TIA). As described below, the improved optical coupling structure eliminates a need to launch input light into a small (e.g., 220 nm×220 nm) single mode waveguide. Rather, the improved optical coupling structure employs tapered waveguides to directly launch input light into the SiGE PD, without a need to propagate a single mode as a 220 nm square. In some implementations, as described below, the improved optical coupling structure is laterally adjacent to the SiGe PD so that there is no need to couple light down to the 220 nm single mode waveguide.

As described below, in some implementations, the improved optical coupling structure may include a multi-core waveguide in order to allow a comparatively greater amount of light to be coupled to the SiGe PD (e.g., as compared to a single taper), thereby reducing optical loss and/or increasing optical efficiency. In some implementations, one or more cores of the multi-core waveguide may include steps in thickness in order to allow stepwise index matching between an input mode (e.g., an optical mode of an integrated optics circuit or a lensed fiber) and an optical mode of a waveguide of the SiGe PD, as described below.

In some implementations, at an input end of the optical coupling structure (e.g., an end of the optical coupling structure at which an integrated optics circuit or a lensed fiber is to be coupled), a silica waveguide or a silicon-oxynitride ($SiO_xN_y$) waveguide with a large mode field diameter (e.g., a mode field diameter in a range from approximately 4 μm to approximately 5 μm) may be provided. This provides a low-loss waveguide that can be butt coupled to an integrated optics circuit or a lensed fiber that is aligned to a waveguide core (which is a typical technology used for PLC to fiber alignment and PLC to PLC alignment).

Additionally, in some implementations, an area of the improved optical coupling structure may be comparable to that which is required for a prior solution that uses a wirebond connection between the PD and the TIA, meaning that a size of the optical receiver need not be significantly increased.

FIGS. 1A and 1B are diagrams of an example optical device 100 including an improved optical coupling structure described herein. FIG. 1A shows an example cross-sectional view of optical device 100 (at line A-A shown in FIG. 1B), while FIG. 1B shows an example top view of optical device 100. One or more optical devices 100 may be included in, for example, an optical receiver.

As shown, optical device 100 may include an integrated optics circuit 102, a silicon-germanium PD 104 (SiGe PD 104), and a silicon-germanium TIA 106 (SiGe TIA 106). As described above, SiGe PD 104 may be integrated with SiGe TIA 106.

As further shown, optical device 100 may include an optical coupling structure 108. As shown, a first end of optical coupling structure 108 may be designed to couple to integrated optics circuit 102, while a second end of optical coupling structure 108 may couple to SiGe PD 104. In some implementations, as shown, optical coupling structure 108 may include a silicon (Si) waveguide 110, a silicon-nitride (SiN) waveguide 112, a silica waveguide 114, and a taper structure 116. In some implementations, a length and/or a width of optical coupling structure 108 may be in a range from approximately 50 μm to approximately 5000 μm. In some implementations, the length is design dependent. For example, a length of optical coupling structure 108 may be between approximately 500 μm and approximately 5 mm in optical coupling structure 108 of optical device 100, while a width of optical coupling structure 108 may be approximately 65 µm. As another example, a length of optical coupling structure 208 may be less than approximately 100 µm.

As shown in FIG. 1A, in some implementations, Si waveguide 110 may be tapered such that a thickness of Si waveguide 110 at the first end of optical coupling structure 108 (e.g., an end of optical coupling structure 108 that is to be coupled to integrated optics circuit 102) is smaller than a thickness of Si waveguide 110 at the second end of optical coupling structure 108 (e.g., an end of optical coupling structure 108 coupled to SiGe PD 104). In some implementations, a thickness of Si waveguide 110 at the first end of optical coupling structure 108 may be in a range from 10 nm to approximately 500 nm, such as approximately 220 nm, and a thickness of Si waveguide 110 at the second end of optical coupling structure 108 may be in a range from 150 nm to approximately 3000 nm, such as approximately 220 nm.

As shown in FIG. 1B, in some implementations, Si waveguide 110 may be tapered such that a width of Si waveguide 110 at the first end of optical coupling structure 108 is smaller than a width of Si waveguide 110 at the second end of optical coupling structure 108. In some implementations, a width of Si waveguide 110 at the first end of optical coupling structure 108 may be in a range from 10 nm to approximately 200 nm, such as approximately 50 nm, and a width of Si waveguide 110 at the second end of optical coupling structure 108 may be in a range from 350 nm to approximately 2000 nm, such as approximately 450 nm.

In some implementations, as illustrated in FIGS. 1A and 1B, Si waveguide 110 may include a gradual taper (e.g., in thickness and/or in width) from the second end of optical coupling structure 108 to the first end of optical coupling structure 108. Additionally, or alternatively, Si waveguide 110 may include a stepped taper comprising at least two steps along the length of optical coupling structure 108 (e.g., such that the taper in Si waveguide 110 is formed by adjacent portions of Si waveguide 110 having different thicknesses or widths).

In some implementations, Si waveguide 110 may be multi-core in a first section of optical coupling structure 108 and single-core in a second section of optical coupling structure 108, an example of which is described below. In some implementations, a given core of Si waveguide 110 may have a width in a range from approximately 350 nm to approximately 2000 nm, such as approximately 450 nm. The use of a multi-core Si waveguide 110 in the first section of optical coupling structure 108 may increase optical coupling efficiency of optical coupling structure 108 (e.g., as compared to a single-core Si waveguide).

As further shown in FIG. 1A, SiN waveguide 112 may be deposited or otherwise arranged on Si waveguide 110 such that SiN waveguide 112 covers Si waveguide 110 along the length of optical coupling structure 108. In some implementations, as shown, SiN waveguide 112 may be tapered such that a thickness of SiN waveguide 112 at the first end of optical coupling structure 108 is smaller than a thickness of SiN waveguide 112 at the second end of optical coupling structure 108. In some implementations, a thickness of SiN waveguide 112 at the first end of optical coupling structure 108 may be in a range from approximately 50 nm to approximately 1000 nm, such as approximately 400 nm, and a thickness of SiN waveguide 112 at the second end of optical coupling structure 108 may be in a range from approximately 50 nm to approximately 1000 nm, such as approximately 400 nm. In some implementations, a thickness of SiN waveguide 112 in the first section of optical coupling structure 108 may be different from (e.g., smaller than) a thickness of Si waveguide 112 in the second section of optical coupling structure 108, an example of which is described below.

As shown in FIG. 1B, in some implementations, SiN waveguide 112 may be tapered such that a width of SiN waveguide 112 at the first end of optical coupling structure 108 is smaller than a width of SiN waveguide 112 at the second end of optical coupling structure 108. In some implementations, a width of SiN waveguide 112 at the first end of optical coupling structure 108 may be in a range from approximately 50 nm to approximately 250 nm, such as approximately 100 nm, and a width of SiN waveguide 112 at the second end of optical coupling structure 108 may be in a range from approximately 250 nm to approximately 6000 nm, such as approximately 1000 nm. In some implementations, as shown in FIG. 1B, a width of SiN waveguide 112 is larger than a width of Si waveguide 110 at a given point along the length of optical coupling structure 108.

In some implementations, as illustrated in FIGS. 1A and 1B, SiN waveguide 112 may include a gradual taper (e.g., in thickness and/or in width) from the second end of optical coupling structure 108 to the first end of optical coupling structure 108. Additionally, or alternatively, SiN waveguide 112 may include a stepped taper comprising at least two steps along the length of optical coupling structure 108 (e.g., such that the taper in SiN waveguide 112 is formed by adjacent portions of SiN waveguide 112 having different thicknesses or widths).

In some implementations, SiN waveguide 112 may be multi-core in a first section of optical coupling structure 108 and single-core in a second section of optical coupling structure 108, an example of which is described below. In some implementations, a given core of SiN waveguide 112 may have a width in a range from approximately 500 nm to approximately 6000 nm, such as approximately 1000 nm. Similar to a multi-core Si waveguide 110, the use of a multi-core SiN waveguide 112 in the first section of optical coupling structure 108 may increase optical coupling efficiency of optical coupling structure 108 (e.g., as compared to a single-core SiN waveguide).

As further shown in FIGS. 1A and 1B, silica waveguide 114 may be deposited or otherwise arranged on SiN waveguide 112 such that silica waveguide 114 covers SiN waveguide 112 along the length of optical coupling structure 108. Notably, in some implementations, silica waveguide 114 may be a waveguide formed from another material (rather than silica), such as a waveguide formed from silicon-oxynitride. In some implementations, at the first end of optical coupling structure 108, silica waveguide 114 may extend past an end of SiN waveguide 112 (e.g., in order to allow for polishing without damaging SiN waveguide 112). In some implementations, as shown, the material from which silica waveguide 114 is formed may cover at least SiGe PD 104, and may cover SiGe TIA 106. Notably, while a portion of the material covering at least SiGe PD 104 does not operate as a waveguide, this portion of the material may act to provide environmental protection for SiGe PD 104/SiGe TIA 106.

As further shown, in some implementations, taper structure 116 may be arranged at or near at the second end of optical coupling structure 108 between Si waveguide 110 and SiN waveguide 112. In some implementations, taper structure 116 may be formed from germanium, amorphous silicon, or another high-index material. In some implementations, taper structure 116 may act to reduce or prevent reflection of light from SiGe PD 104 toward integrated optics circuit 102. In some implementations, taper structure 116 may be tapered such that a thickness of taper structure 116 at a first end of taper structure 116 (e.g., an end of taper structure 116 distal to SiGe PD 104) is smaller than a thickness of taper structure 116 at a second end of taper structure 116 (e.g., an end of taper structure 116 proximal to SiGe PD 104). In some implementations, a thickness of taper structure 116 at the first end of taper structure 116 may be in a range from approximately 50 nm to approximately 1000 nm, such as approximately 150 nm, and a thickness of taper structure 116 at the second end of taper structure 116 may be in a range from approximately 50 nm to approximately 1000 nm, such as approximately 150 nm.

Similarly, in some implementations, taper structure 116 may be tapered such that a width of taper structure 116 at the first end of taper structure 116 is smaller than a width of taper structure 116 at the second end of taper structure 116. In some implementations, a width of taper structure 116 at the first end of taper structure 116 may be in a range from approximately 50 nm to approximately 250 nm, such as approximately 100 nm, and a width of taper structure 116 at the second end of taper structure 116 may be in a range from approximately 200 nm to approximately 1000 nm, such as approximately 500 nm. In some implementations, as shown in FIG. 1B, the width of taper structure 116 at the second end of taper structure 116 may match a width of one or more germanium layers of SiGe PD 104.

As shown in FIGS. 1A and 1B, the first end of optical coupling structure 108 may be coupled to integrated optics circuit 102 (e.g., such that integrated optics circuit 102 launches input light into the first end of optical coupling structure 108). Integrated optics circuit 102 may include, for example, a PLC, a silicon photonics circuit, an indium-phosphide (InP) based integrated optics circuit, a SiN-based integrated optics circuit, and/or the like. As further shown, the second end of optical coupling structure 108 couples to SiGe PD 104. In some implementations, optical coupling structure 108 may be integrated with an integrated SiGe PD 104/SiGe TIA 106.

As indicated above, FIGS. 1A and 1B are provided merely as examples. Other examples are possible and may differ from what was described with regard to FIGS. 1A and 1B. The number and arrangement of components and layers shown in FIGS. 1A and 1B are provided as an example. In practice, there may be additional components and/or layers, fewer components and/or layers, different components and/or layers, differently arranged components and/or layers, differently sized components and/or layers, components and/or layers with different relative sizes, and/or the like, than those shown in FIGS. 1A and 1B.

Figure 2B:
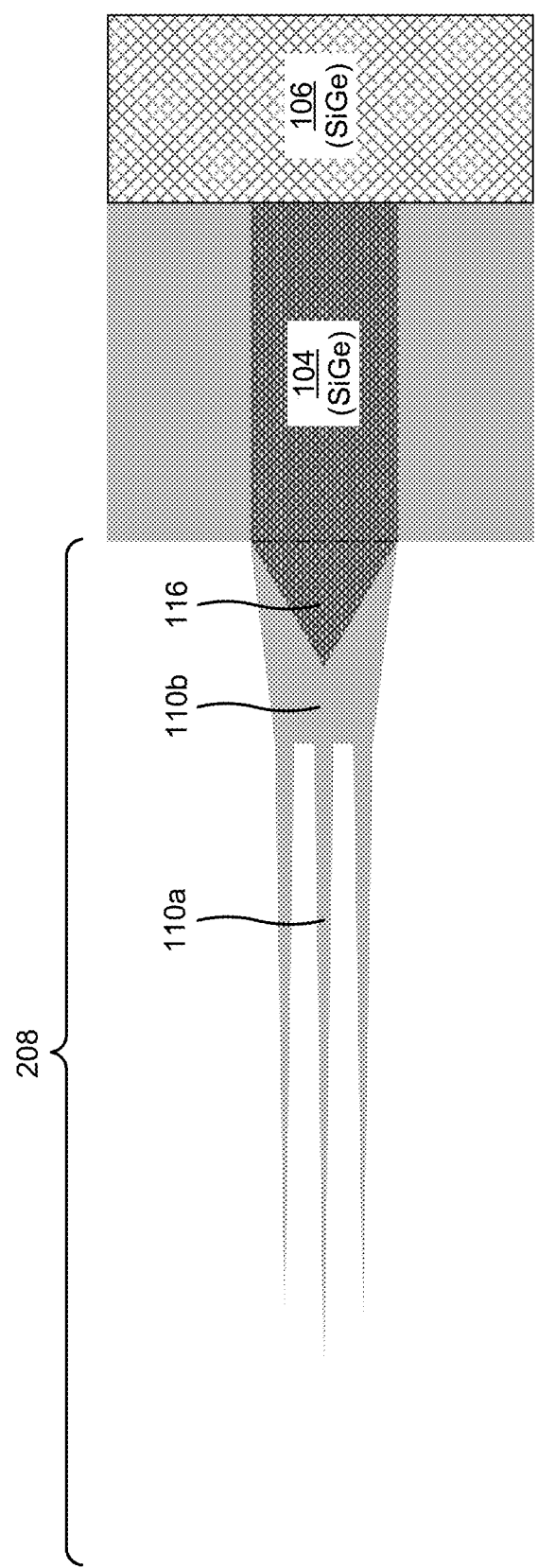
Figure 2C:
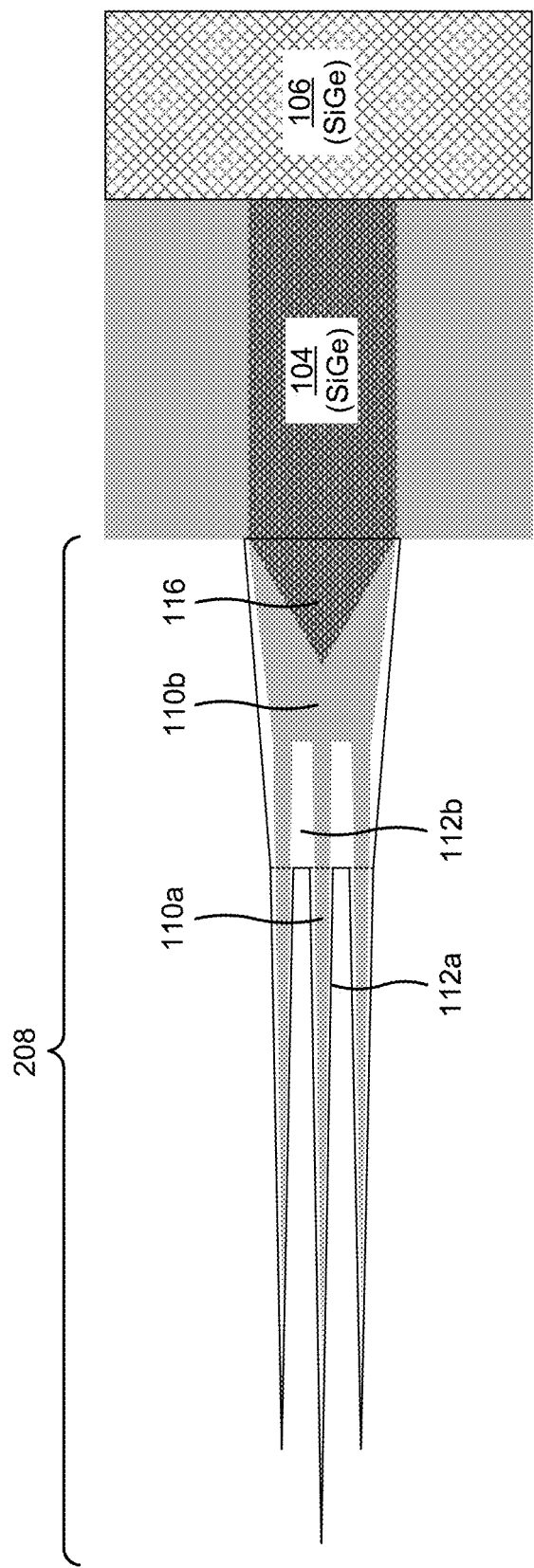
Figure 2D:
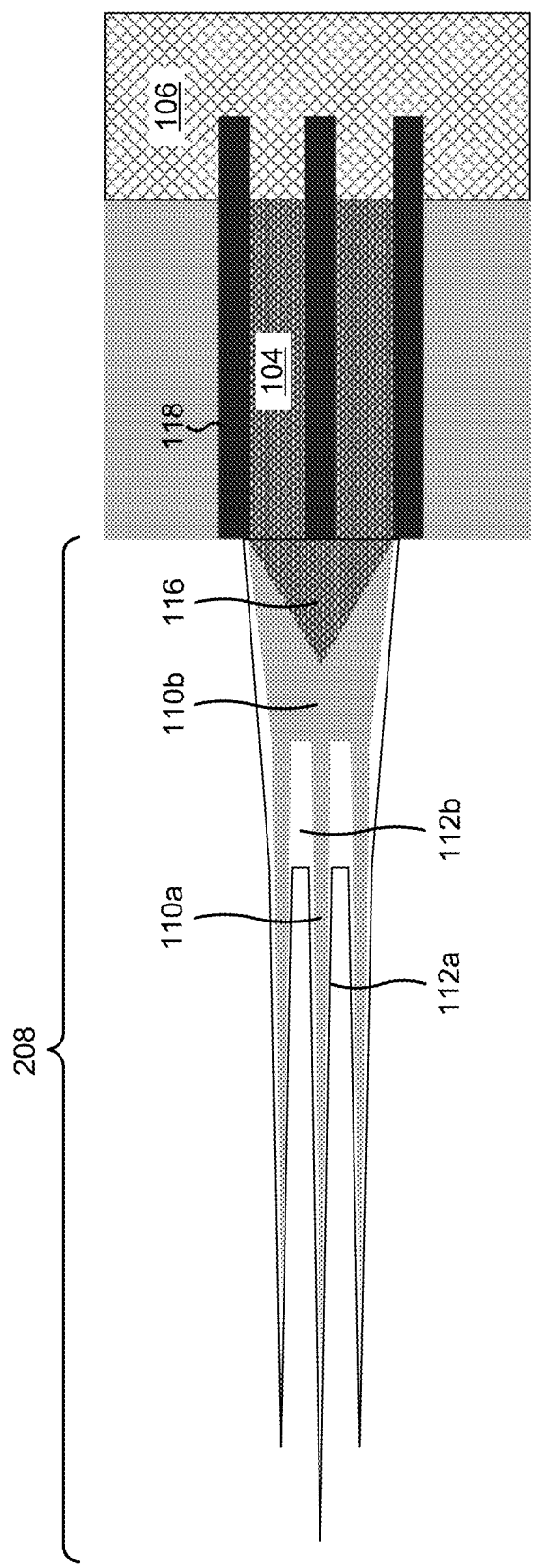
Figure 2E:
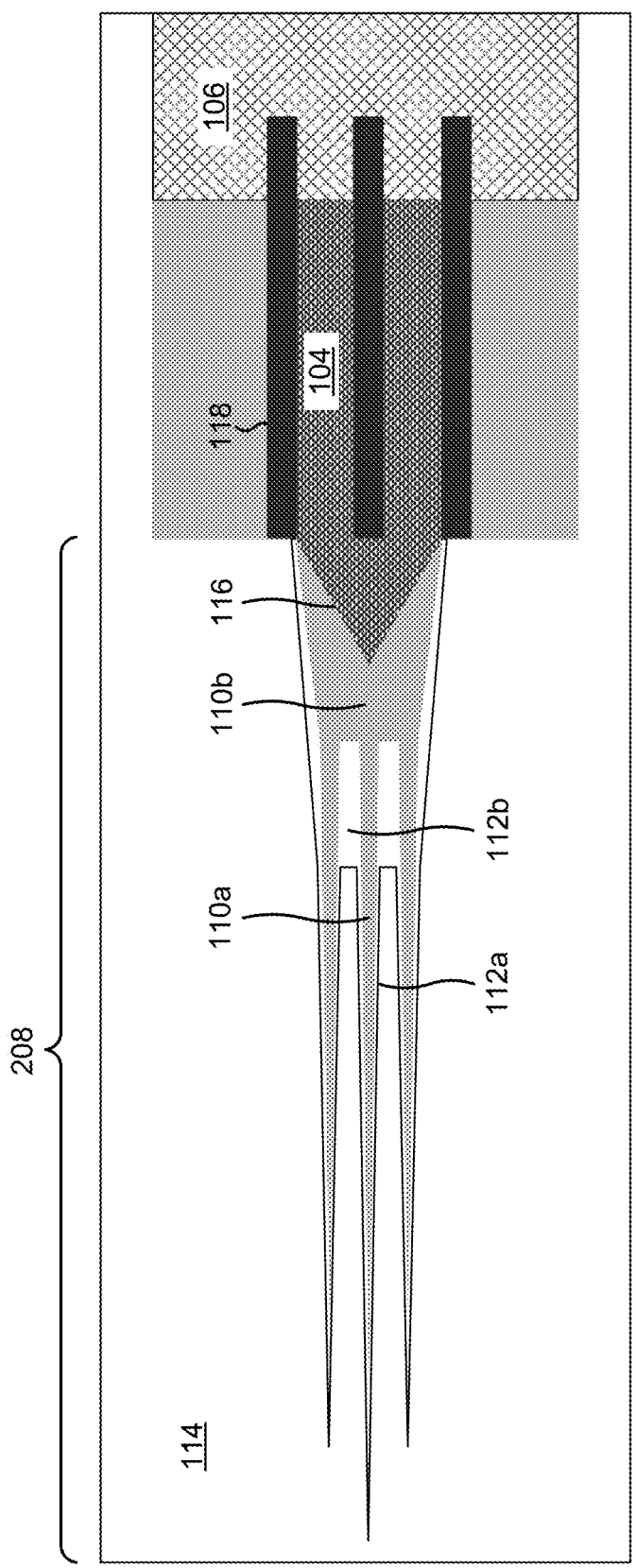
Figure 2F:
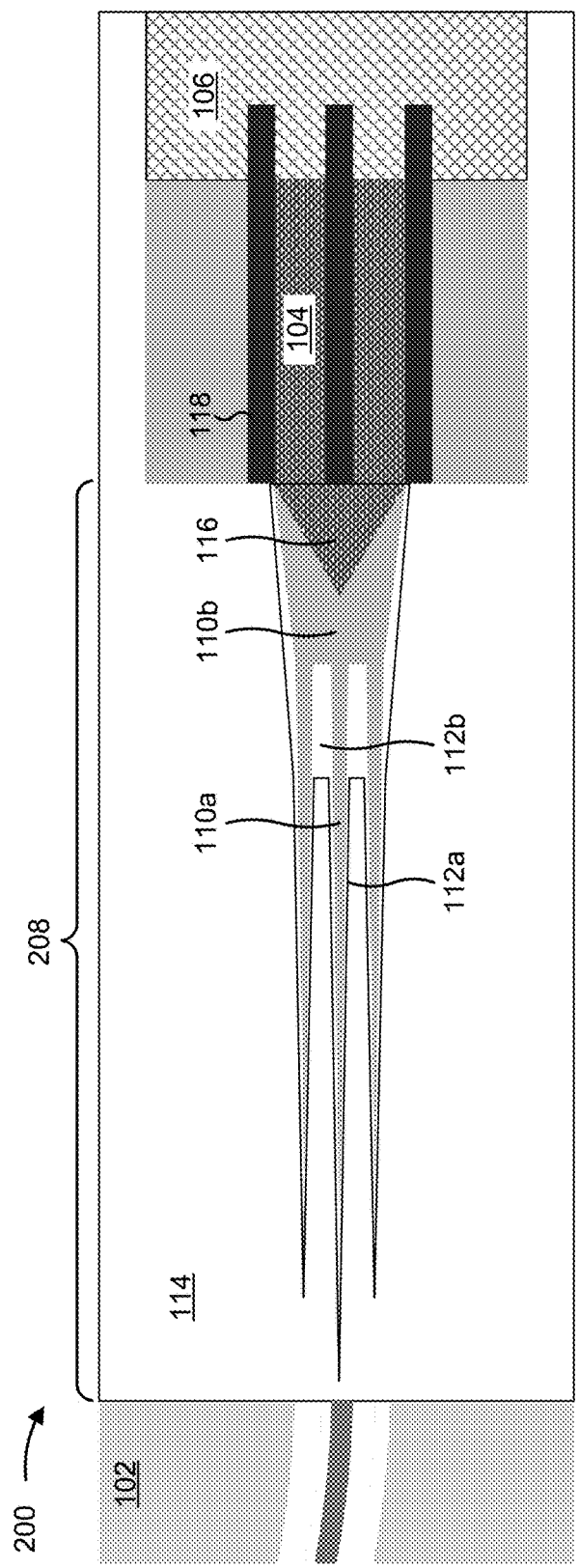
Figure 2G:
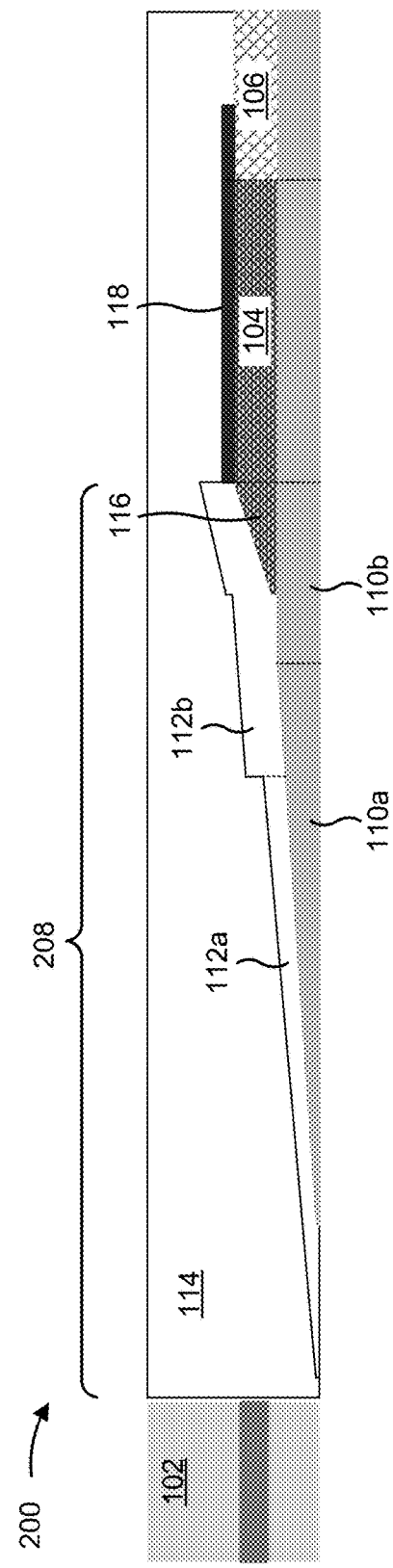
Figure 2H:
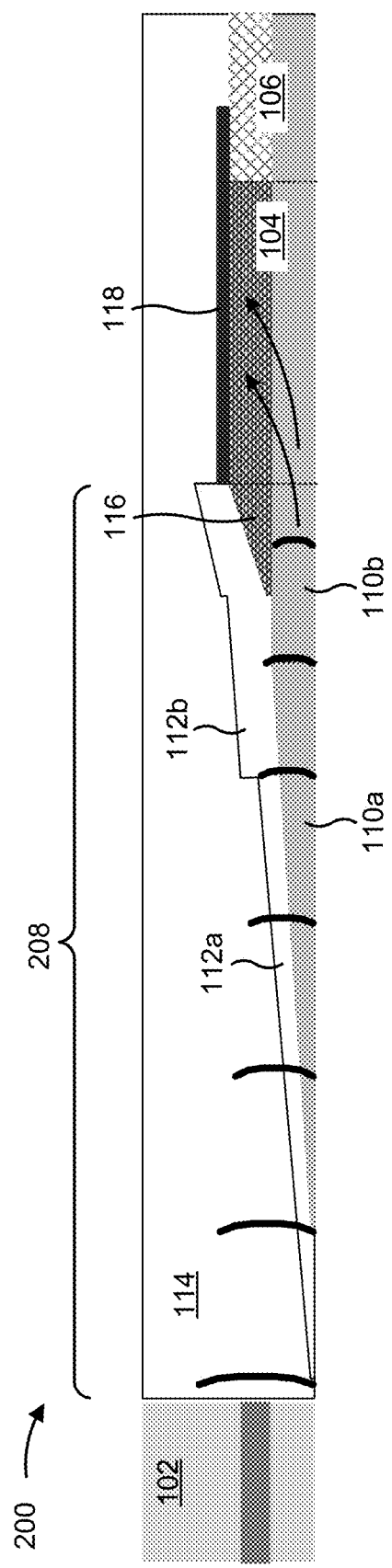

FIGS. 2A-2H are diagrams associated with an example implementation 208 of optical coupling structure 108 (herein referred to as optical coupling structure 208) that is coupled to an integrated SiGe PD 104/SiGe TIA 106. FIGS. 2A-2E shows various layers of optical coupling structure 208 and integrated SiGe PD 104/SiGe TIA 106 starting from a substrate layer (not shown) on which optical coupling structure 108, SiGe PD 104 and, SiGe TIA 106 may be formed. FIGS. 2F and 2G show coupling of optical coupling structure 208 to integrated optics circuit 102. FIG. 2H shows an example of light propagation from integrated optics circuit 102 to integrated SiGe PD 104/SiGe TIA 106 via optical coupling structure 208.

As shown in FIG. 2A, optical coupling structure 208 may include Si waveguide 110 comprising Si waveguide 110a in a first section and Si waveguide 110b in a second section. In some implementations, a first end of Si waveguide 110 (e.g., a left end of Si waveguide 110a in FIG. 2A) may be proximal to a first end of optical coupling structure 208 (e.g., an end of optical coupling structure 208 that is to be coupled to integrated optics circuit 102), while a second end of Si waveguide 110 (e.g., a right end of Si waveguide 110b in FIG. 2A) may couple to SiGe PD 104.

In some implementations, as shown, Si waveguide 110a may be multi-core (e.g., Si waveguide 110a includes three tapered cores in optical coupling structure 208). In some implementations, in order to improve coupling efficiency of optical coupling structure 208, one or more cores (e.g., a middle core) of Si waveguide 110a may have a length that is greater than a length of one or more other cores of Si waveguide 110a. As further shown, in some implementations, Si waveguide 110b may be single-core, and a first end of Si waveguide 110b (e.g., a left end of Si waveguide 110b in FIG. 2A) may have a width that matches that of a second end of Si waveguide 110a (e.g., a right end of Si waveguide 110a in FIG. 2A).

As shown in FIG. 2A, and as described above, Si waveguide 110 (e.g., Si waveguide 110a and Si waveguide 110b) may be tapered such that a size (e.g., a thickness, a width) of Si waveguide 110 at the first end of optical coupling structure 208 is smaller than a size of Si waveguide 110 at the second end of optical coupling structure 208. For example, as shown, a width of each core of Si waveguide 110a may taper along the length of optical coupling structure 208 in a direction from the second end toward the first end, and a width of Si waveguide 110b may taper along the length of optical coupling structure 208 in a direction from the second end toward the first end.

FIG. 2A further illustrates a silicon portion of SiGe PD 104 (e.g., one or more silicon layers on which germanium is to be deposited in association with forming SiGe PD 104) and a silicon portion of SiGe TIA 106 (e.g., one or more silicon layers on which germanium is to be deposited in association with forming SiGe TIA 106). As shown, Si waveguide 110 may be deposited or etched such that light propagating through optical coupling structure 208 (e.g., from left to right in FIG. 2A) is coupled to SiGe PD 104 at partially through Si waveguide 110.

As shown in FIG. 2B, optical coupling structure 208 may include taper structure 116 deposited on a portion of Si waveguide 110b. As shown in FIG. 2B, and as described above, in some implementations, taper structure 116 may be tapered such that a size (e.g., a thickness or a width) of taper structure 116 at a first end of taper structure 116 (e.g., an end of taper structure 116 distal to SiGe PD 104) is smaller than a size of taper structure 116 at a second end of taper structure 116 (e.g., an end of taper structure 116 proximal to SiGe PD 104). In some implementations, taper structure 116 may act to reduce or prevent reflection of light from SiGe PD 104 toward integrated optics circuit 102. In some implementations, taper structure 116 may be formed from, for example, germanium or amorphous silicon.

FIG. 2B further illustrates a germanium portion of SiGe PD 104 (e.g., one or more germanium layers deposited on the one or silicon layers of SiGe PD 104) and a germanium portion of SiGe TIA 106 (e.g., one or more germanium layers deposited on the one or silicon layers of SiGe TIA 106).

As shown in FIG. 2C, optical coupling structure 208 may include SiN waveguide 112 comprising SiN waveguide 112a in a first section and SiN waveguide 112b in a second section. In some implementations, a first end of SiN waveguide 112 (e.g., a left end of SiN waveguide 112a in FIG.

2C) may be proximal to the first end of optical coupling structure 208, while a second end of SiN waveguide 112b may couple to SiGe PD 104.

In some implementations, as shown, SiN waveguide 112a may be multi-core (e.g., SiN waveguide 112a includes three tapered cores in optical coupling structure 208). In some implementations, in order to improve coupling efficiency of optical coupling structure 208, one or more cores (e.g., a middle core) of SiN waveguide 112a may have a length that is greater than a length of one or more other cores of SiN waveguide 112a. As further shown, in some implementations, SiN waveguide 112b may be single-core, and a first end of SiN waveguide 112b (e.g., a left end of SiN waveguide 112b in FIG. 2C) may have a width that matches that of a second end of SiN waveguide 112a (e.g., a right end of SiN waveguide 112a in FIG. 2C).

As shown in FIG. 2C, and as described above, SiN waveguide 112 (e.g., SiN waveguide 112a and SiN waveguide 112b) may be tapered such that a size (e.g., a thickness, a width) of SiN waveguide 112 at the first end of optical coupling structure 208 is smaller than a size of SiN waveguide 112 at the second end of optical coupling structure 208. For example, as shown, a width of each core of SiN waveguide 112a may taper along the length of optical coupling structure 208 in a direction from the second end toward the first end, while a width of SiN waveguide 112b may taper along the length of optical coupling structure 208 in a direction from the second end toward the first end. In some implementations, as shown in FIG. 2C, SiN waveguide 112 may be deposited and/or etched such that SiN waveguide 112 covers Si waveguide 110.

As shown in FIG. 2D, a contact layer 118 (e.g., including one or more contacts formed from a metallic material, such as gold) may be formed such that an electrical signal can be provided from SiGe PD 104 to SiGe TIA 106. For example, a first portion of contact layer 118 (e.g., a left portion of each of the three contacts shown in FIG. 2D) may be formed on SiGe PD 104, while a second portion of contact layer 118 (e.g., a right portion of each of the three contacts shown in FIG. 2D) may be formed on SiGe TIA 106 in order to allow SiGe PD 104 to provide a current signal to SiGe TIA 106. Notably, the connection between SiGe PD 104 and SiGe TIA 106 does not require wirebonds and, therefore, eliminates the wirebond-related issues described above.

As shown in FIG. 2E, optical coupling structure 208 may include silica waveguide 114 that is deposited or otherwise arranged on SiN waveguide 112. As shown, in some implementations, at the first end of optical coupling structure 208, silica waveguide 114 may extend past an end of SiN waveguide 112 (e.g., in order to allow for polishing without damaging SiN waveguide 112). In some implementations, as shown, the material from which silica waveguide 114 is formed may cover both SiGe PD 104 and SiGe TIA 106 (e.g., in order to provide environmental protection for SiGe PD 104/SiGe TIA 106), without acting as a waveguide. In some implementations, silica waveguide 114 may include an angled facet (e.g., a 14 degree etched facet) in order to reduce reflection at an interface between integrated optics circuit 102 and optical coupling structure 208.

FIGS. 2F and 2G are diagrams of an optical device 200 including optical coupling structure 208 described above. As shown in FIG. 2F, in optical device 200, the first end of optical coupling structure 208 may be coupled to integrated optics circuit 102 (e.g., a PLC, a silicon photonics circuit, and/or the like). FIG. 2F shows a top view of optical device 200, while FIG. 2G shows a cross-section view along a center of optical coupling structure 208. As illustrated in FIG. 2G, and as described above, Si waveguide 110, SiN waveguide 112, and taper structure 116 may be tapered such that their respective sizes increase in a direction along the length of optical coupling structure 208 from the first end of optical coupling structure 208 to the second end of optical coupling structure 208.

FIG. 2H shows an example of light propagation through optical device 200 from integrated optics circuit 102 to SiGe PD 104 via optical coupling structure 208 (e.g., from left to right in FIG. 2H). In FIG. 2H, input light (e.g., light comprising one or more wavelength channels) is launched by a waveguide of integrated optics circuit 102 (e.g., a PLC waveguide) into silica waveguide 114 toward SiGe PD 104.

As indicated by the thick curved vertical lines in FIG. 2H, the input light couples from silica waveguide 114 to Si waveguide 110 (through SiN waveguide 112) along a length of optical coupling structure 208. As further shown, the light that propagates from Si waveguide 110 to a silicon portion of SiGe PD 104 and, as the input light propagates along a length of SiGe PD 104, the input light is absorbed by a germanium portion of SiGe PD 104. SiGe PD 104 may convert the input light to a current signal, and provide the current signal to SiGe TIA 106 via contact layer 118.

In some implementations, the improved optical coupling structures described herein (herein collectively referred to as optical coupling structure 108/208) provide low loss coupling from integrated optics circuit 102 to SiGe PD 104. For example, silica has a refractive index (n=1.5) that is significantly different from that of silicon (n=3.5) and germanium (n=4.0). As such, coupling directly from a waveguide of integrated optics circuit 102 (e.g., a PLC waveguide) to SiGe PD 104 may be inefficient and/or lossy. However, silicon-nitride has a refractive index (n=2.0) that between that of silica and that of silicon (and germanium). As such, silicon-nitride may allow for coupling from silica to silicon or germanium with improved coupling loss (e.g., due to the comparatively better index matching).

In optical coupling structure 108/208, the tapered design of SiN waveguide 112 and the index relationship between silica and silicon-nitride allows the input light to be pulled from silica waveguide 114 into SiN waveguide 112 along the length of optical coupling structure 108/208 with relatively low reflection. Similarly, the tapered designed of Si waveguide 110 and the index relationship between silicon-nitride and silicon allows the input light to be pulled from SiN waveguide 112 into Si waveguide 110 along the length of optical coupling structure 108/208 with relatively low reflection. Further, taper structure 116 and the index relationship between silicon and germanium allows the light be absorbed from Si waveguide 110 and/or the silicon portion of SiGe PD 104 into the germanium portion of SiGe PD 104 (along the length of SiGe PD 104) with low reflection.

In this way, the stacked tapered structure (e.g., including Si waveguide 110, SiN waveguide 112, and taper structure 116) of optical coupling structure 108/208 causes the refractive index of optical coupling structure 208 to adiabatically vary from that of silica (n=1.5) to that of germanium (n=4.0) along the length of optical coupling structure 108/208. Thus, as the input light propagates through optical coupling structure 108/208, the input light couples from silica waveguide 114 to Si waveguide 110 and into SiGe PD 104 with low coupling loss. As such, input light with a relatively large mode field diameter (e.g., approximately 5 μm) can be coupled to SiGe PD 104 with low optical loss, and without a need to couple to a relatively small single mode silicon waveguide (e.g., a 220 nm square single mode waveguide).

The number and arrangement of components and layers shown in FIGS. 2A-2H are provided as an example. In practice, there may be additional components and/or layers, fewer components and/or layers, different components and/or layers, differently arranged components and/or layers, differently sized components and/or layers, components and/or layers with different relative sizes, and/or the like, than those shown in FIGS. 2A-2H.

The foregoing disclosure provides illustration and description, but is not intended to be exhaustive or to limit the implementations to the precise form disclosed. Modifications and variations are possible in light of the above disclosure or may be acquired from practice of the implementations.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. An optical device, comprising:
    a silicon-germanium photodetector; and
    an optical coupling structure to couple the silicon-germanium photodetector to an integrated optics circuit, wherein the optical coupling structure comprises:
        a silicon waveguide,
            wherein the silicon waveguide is tapered such that a thickness of the silicon waveguide at a first end of the optical coupling structure is smaller than a thickness of the silicon waveguide at a second end of the optical coupling structure,
            wherein the first end of the optical coupling structure is to couple to the integrated optics circuit and the second end of the optical coupling structure couples to the silicon-germanium photodetector, and
            wherein the silicon waveguide is tapered such that a width of the silicon waveguide at the first end of the optical coupling structure is smaller than a width of the silicon waveguide at the second end of the optical coupling structure;
        a silicon-nitride waveguide that encapsulates the silicon waveguide,
            wherein the silicon-nitride waveguide is tapered such that a width of the silicon-nitride waveguide at the first end of the optical coupling structure is smaller than a width of the silicon-nitride waveguide at the second end of the optical coupling structure; and
        a silica waveguide that encapsulates the silicon-nitride waveguide.

2. The optical device of claim 1, wherein the silicon-germanium photodetector is integrated with a silicon-germanium transimpedance amplifier.

3. The optical device of claim 1, wherein the integrated optics circuit is a planar lightwave circuit.

4. The optical device of claim 1, wherein the optical coupling structure further comprises a taper structure at the second end of the optical coupling structure,
    wherein the taper structure is between the silicon waveguide and the silicon-nitride waveguide.

5. The optical device of claim 4, wherein the taper structure is formed from germanium or amorphous silicon.

6. The optical device of claim 1, wherein the thickness of the silicon waveguide includes at least two steps along a length of the optical coupling structure.

7. The optical device of claim 1, wherein the silicon waveguide is multi-core in a first section the optical coupling structure and is single-core in a second section of the optical coupling structure.

8. The optical device of claim 1, wherein the silicon-nitride waveguide is multi-core in a first section the optical coupling structure and is single-core in a second section of the optical coupling structure.

9. The optical device of claim 1, wherein a width of the silicon-nitride waveguide is larger than a width of the silicon waveguide along a length of the optical coupling structure.

10. The optical device of claim 1, wherein a thickness of the silicon-nitride waveguide in a first section of the optical coupling structure is different from a thickness of the silicon-nitride waveguide in a second section of the optical coupling structure.

11. The optical device of claim 1, wherein the silica waveguide covers the silicon-germanium photodetector.

12. An optical device, comprising:
    an optical coupling structure having a first end that is to couple to an integrated optics circuit and a second end that couples to a silicon-germanium photodetector, the optical coupling structure comprising:
        a silicon waveguide,
            wherein a thickness of the silicon waveguide at the second end is larger than a thickness of the silicon waveguide at the first end, and
            wherein a width of the silicon waveguide at the second end is larger than a width of the silicon waveguide at the first end;
        a silicon-nitride waveguide encapsulating the silicon waveguide,
            wherein a width of the silicon-nitride waveguide at the second end is larger than a width of the silicon-nitride waveguide at the first end; and
        a silica waveguide encapsulating the silicon-nitride waveguide.

13. The optical device of claim 12, wherein the silicon-germanium photodetector is integrated with a silicon-germanium transimpedance amplifier.

14. The optical device of claim 12, wherein the integrated optics circuit is a planar lightwave circuit.

15. The optical device of claim 12, wherein the optical coupling structure further comprises a taper structure near the second end of the optical coupling structure,
    wherein the taper structure is between the silicon waveguide and the silicon-nitride waveguide.

16. The optical device of claim 12, wherein the thickness of the silicon waveguide includes at least two steps along a length of the optical coupling structure.

17. The optical device of claim 12, wherein the silicon waveguide is multi-core in a first section the optical coupling structure and is single-core in a second section of the optical coupling structure.

18. The optical device of claim 12, wherein the silicon-nitride waveguide is multi-core in a first section the optical coupling structure and is single-core in a second section of the optical coupling structure.

19. The optical device of claim 12, wherein a width of the silicon-nitride waveguide is larger than a width of the silicon waveguide along a length of the optical coupling structure.

20. An optical coupling structure, comprising:
  a silicon waveguide,
    wherein a size of the silicon waveguide tapers along a length of the optical coupling structure between a second end of the optical coupling structure and a first end of the optical coupling structure,
    wherein the first end of the optical coupling structure is to couple to an integrated optics circuit, and
    wherein the second end of the optical coupling structure couples to a silicon-germanium photodetector;
  a silicon-nitride waveguide encapsulating the silicon waveguide along the length of the optical coupling structure,
    wherein a size of the silicon-nitride waveguide tapers along the length of the optical coupling structure between the second end of the optical coupling structure and the first end of the optical coupling structure; and
  a silica waveguide encapsulating the silicon-nitride waveguide along the length of the optical coupling structure.

* * * * *